US012785587B2

(12) United States Patent
Zhang et al.

(10) Patent No.: US 12,785,587 B2
(45) Date of Patent: Nov. 3, 2026

(54) PULSE WIDTH MODULATION CONTROL MODULE FOR AN INVERTER

(71) Applicant: Eaton Intelligent Power Limited, Dublin (IE)

(72) Inventors: Zhe Zhang, Menomonee Falls, WI (US); Hua Qiang Li, Menomonee Falls, WI (US); Thomas M. Ruchti, Pewaukee, WI (US)

(73) Assignee: Eaton Intelligent Power Limited, Dublin (IE)

( * ) Notice: Subject to any disclaimer, the term of this patent is extended or adjusted under 35 U.S.C. 154(b) by 300 days.

(21) Appl. No.: 18/243,189

(22) Filed: Sep. 7, 2023

(65) Prior Publication Data

US 2025/0088122 A1 Mar. 13, 2025

(51) Int. Cl.

| | |
|---|---|
| ***H02M 7/5395*** | (2006.01) |
| ***H02M 1/08*** | (2006.01) |
| ***H02P 27/08*** | (2006.01) |

(52) U.S. Cl.

CPC .......... *H02M 7/5395* (2013.01); *H02M 1/08* (2013.01); *H02P 27/08* (2013.01)

(58) Field of Classification Search

CPC .. H02M 7/5395; H02M 1/08; H02M 7/53871; H02M 7/53876; H02M 1/123; H02M 1/0003; H02P 27/08; H02J 3/32; H02J 3/38

USPC .......................................................... 363/131

See application file for complete search history.

(56) References Cited

U.S. PATENT DOCUMENTS

| | | | | |
|---|---|---|---|---|
| 8,107,267 | B2 | 1/2012 | Tallam et al. | |
| 9,520,800 | B2 * | 12/2016 | Tian .................... | H02M 7/4833 |
| 2006/0192522 | A1 | 8/2006 | Kerkman et al. | |
| 2019/0131868 | A1 * | 5/2019 | Wang ................ | H02M 7/53875 |

OTHER PUBLICATIONS

Un "A Near State PWM Method With Reduced Switching Frequency And Reduced Common Mode Voltage For Three-Phase Voltage Source Inverters" (Year: 2007).*

Emre Ün et al, "A Near State PWM Method With Reduced Switching Frequency And Reduced Common Mode Voltage For Three-Phase Voltage Source Inverters," 2007 IEEE International Electric Machines & Drives Conference, Antalya, Turkey, 2007, pp. 235-240.

(Continued)

*Primary Examiner* — Thienvu V Tran

*Assistant Examiner* — Lauren Ashley Shaw

(74) *Attorney, Agent, or Firm* — DiBerardino McGovern IP Group LLC

(57) ABSTRACT

A system includes: an energy storage apparatus; an inverter electrically coupled to the energy storage apparatus; and a pulse width modulation module. The pulse width modulation module is configured to: determine a modulation index based on a voltage of the energy storage apparatus and a target output voltage of the inverter; select one of a plurality of pulse width modulation (PWM) approaches based on the modulation index; and determine a switching command for the inverter based on the target output voltage and the selected one of the plurality of PWM modulation approaches.

21 Claims, 7 Drawing Sheets

200

(56) References Cited

OTHER PUBLICATIONS

Henglin Chen et al, "Review on pulse-width modulation strategies for common-mode voltage reduction in three-phase voltage-source inverters", IET Power Electronics, vol. 9, Issue 14, 2016, pp. 2611-2620.

Hongjin Hu et al, "A Simplified Space Vector Pulse Width Modulation Algorithm of a High-Speed Permanent Magnet Synchronous Machine Drive for a Flywheel Energy Storage System" Energies 2022, 15, 4065, 21 total pages.

Jin-Woo Jung, Ph.D. Student, "Project #2 Space Vector PWM Inverter", Mechatronic Systems Laboratory Department Of Electrical And Computer Engineering, The Ohio State University, Feb. 20, 2005, 35 total pages.

Mario Cacciato et al, "Reduction of common-mode currents in PWM inverter motor drives," in IEEE Transactions on Industry Applications, vol. 35, No. 2, Mar.-Apr. 1999, pp. 469-476.

Yen-Shin Lai et al, "Optimal Common-Mode Voltage Reduction PWM Technique for Inverter Control With Consideration of the Dead-Time Effects—Part I: Basic Development", IEEE Transactions on Industry Applications, vol. 40, No. 6, Nov./Dec. 2004, p. 1605-1606.

* cited by examiner

600

PULSE WIDTH MODULATION CONTROL MODULE FOR AN INVERTER

TECHNICAL FIELD

This disclosure relates to a pulse width modulation control module for an inverter.

BACKGROUND

An electrical apparatus, such as a variable speed drive, an adjustable speed drive, or an uninterruptable power supply, may be connected to an alternating current (AC) high-power electrical distribution system, such as a power grid. The electrical apparatus drives, powers, and/or controls a machine, or a non-machine type of load. The electrical apparatus may include an inverter that generates a driver signal for the load.

SUMMARY

In one aspect, a system includes: an energy storage apparatus; an inverter electrically coupled to the energy storage apparatus; and a pulse width modulation module. The pulse width modulation module is configured to: determine a modulation index based on a voltage of the energy storage apparatus and a target output voltage of the inverter; select one of a plurality of pulse width modulation (PWM) approaches based on the modulation index; and determine a switching command for the inverter based on the target output voltage and the selected one of the plurality of PWM modulation approaches.

Implementations may include one or more of the following features.

The plurality of PWM approaches may include: a near state PWM approach, a single-mode remote state PWM approach, and a dual-mode remote state PWM approach.

To select one of a plurality of PWM approaches based on the modulation index, the pulse width modulation module may be configured to determine in which of at least two modulation regions the modulation index falls.

The at least two modulation regions may include a remote state PWM region and a near state PWM region. The remote state PWM region may include: a single-mode remote state PWM region, and a dual-mode remote state PWM region. Each of the near state PWM region, the single-mode remote state PWM region, and the dual-mode remote state PWM region may be defined by a respective minimum modulation index value and a maximum modulation index value, and, in these implementations, the dual-mode remote state PWM region is between the single-mode remote region and the near state PWM region.

The system also may include an energy source electrically connected to the energy storage apparatus, and the energy source may be configured to provide a direct current (DC) current to the energy storage apparatus. The energy source may be a rectifier.

The pulse width modulation module may be configured to select the one of the plurality of PWM approaches based on the modulation index and a setting, and the setting may indicate whether or not to reduce common mode voltage. In some implementations, if the setting indicates not to reduce common mode voltage, the selected one of the plurality of PWM approaches is space vector pulse width modulation (SVPWM). The setting may be a value that is set based on a user input.

In another aspect, a control system for an inverter includes: a pulse width modulation module configured to: determine a modulation index based on a voltage of an energy storage apparatus in the inverter and a target output voltage of the inverter; select one of a plurality of pulse width modulation (PWM) approaches based on one or more of the modulation index and a common mode voltage setting; determine a switching command for the inverter based on the target output voltage and the selected one of the plurality of PWM modulation approaches; and provide the switching command to the inverter to thereby modulate DC energy in the energy storage apparatus into a driver signal.

Implementations may include one or more of the following features.

The pulse width modulation module may be configured to select the one of the plurality of PWM approaches based on the modulation index and the common mode voltage setting. The common mode voltage setting may indicate whether or not to reduce common mode voltage; and the pulse width modulation module may be configured to select one of a plurality of active voltage vector PWM approaches based on the modulation index if the common mode voltage setting indicates to reduce common mode voltage; and the pulse width modulation module may be configured to select space vector pulse width modulation (SVPWM) if the common mode voltage setting indicates not to reduce common mode voltage. The plurality of active voltage vector PWM approaches may include: a near state PWM approach, a single-mode remote state PWM approach, and a dual-mode remote state PWM approach.

In another aspect, a method includes: determining a modulation index based on a voltage of an energy storage apparatus in the inverter and a target output voltage of the inverter; selecting one of a plurality of pulse width modulation (PWM) approaches based on the modulation index; determining a switching command for the inverter based on the target output voltage and the selected one of the plurality of PWM modulation approaches; and providing the switching command to the inverter to thereby control the inverter to: modulate energy in the energy storage apparatus into a driver signal that is provided to the load.

Implementations may include one or more of the following features.

Selecting one of a plurality of PWM approaches based on the modulation index may include selecting one of a near state PWM approach, a single-mode remote state PWM approach, a dual-mode remote state PWM approach, and space vector pulse width modulation (SVPWM). In some implementations, for modulation indexes less than or equal to 0.906, providing the driver signal to the load induces less common mode voltage in the load than a driver signal produced by controlling the inverter based on a switching command determined based on the target output voltage and standard SVPWM induces. In some implementations, for modulation indexes less than or equal to 0.906, providing the driver signal to the load induces lower common mode currents in the load than a driver signal produced by controlling the inverter based on a switching command determined based on the target output voltage and standard SVPWM induces.

Selecting the one of the plurality of PWM approaches may include selecting the PWM approach that has a linear region that includes the determined modulation index.

Implementations of any of the techniques described herein may include an apparatus, a device, a system, a control system, machine-executable instructions, and/or a method. The details of one or more implementations are set forth in the accompanying drawings and the description below. Other features will be apparent from the description and drawings, and from the claims.

DRAWING DESCRIPTION

DETAILED DESCRIPTION

Figure 1:
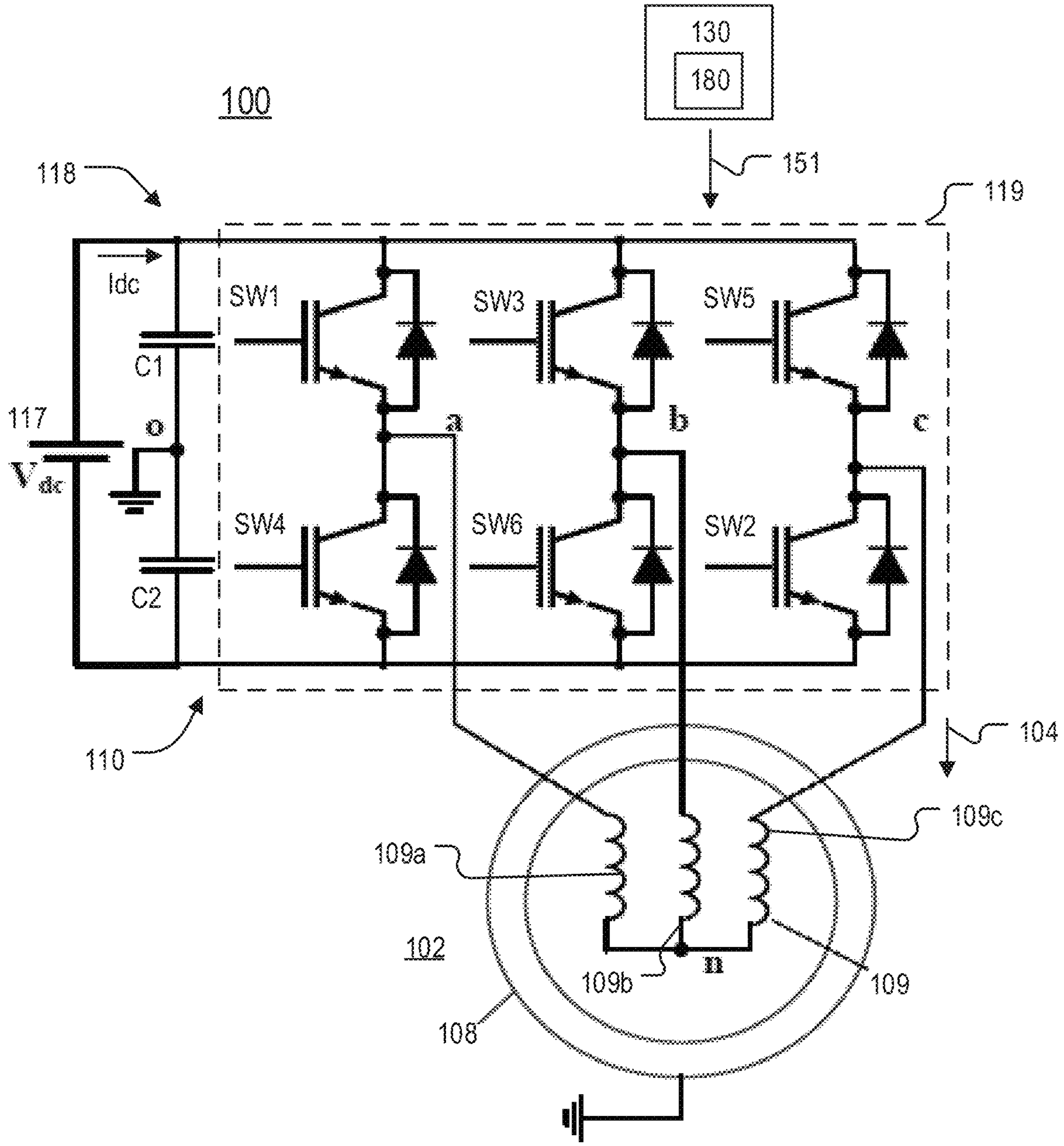
FIG. 1 is an example of a system that includes an inverter.
Figure 2:
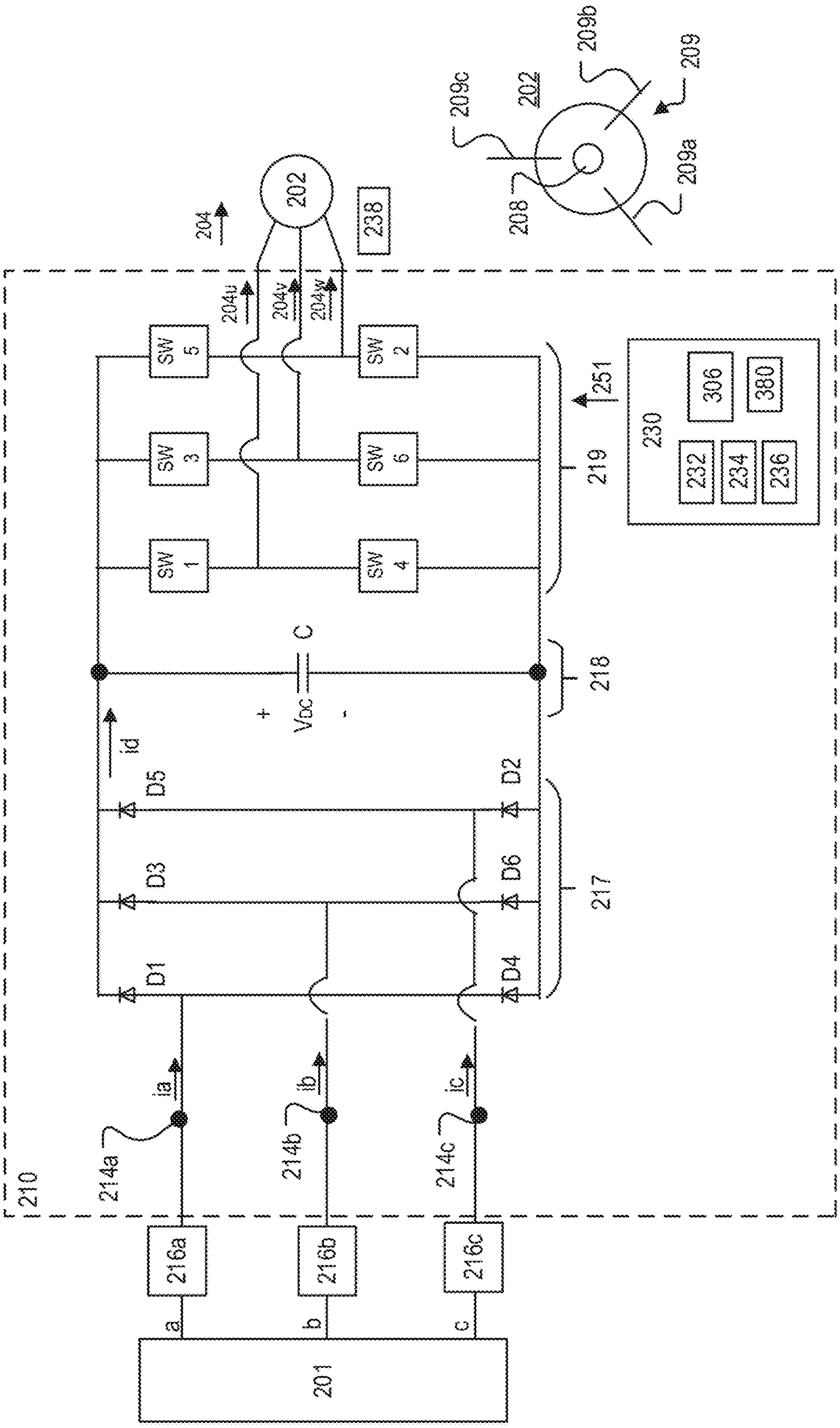
FIG. 2 is another example of a system that includes an inverter.

FIG. 1 illustrates a system 100. The system 100 includes an electrical apparatus 110 that includes a DC power supply 117, an energy storage apparatus 118, and an inverter 119. The DC power supply 117 provides a DC current (Idc) to the energy storage apparatus 118. The DC power supply 117 may be, for example, a battery or a generator. In some implementations (such as shown in FIG. 2), the power supply 117 is a rectifier that converts AC current into the DC current Idc. In the example of FIG. 1, the energy storage apparatus 118 includes capacitors C1 and C2 that are connected at a grounded mid-point (labeled o). The DC current Idc flows into the energy storage apparatus 118 and is stored as potential energy. The inverter 119 modulates the energy stored in the energy storage apparatus 118 into a three-phase driver signal 104 that is applied to an AC motor 102. The three-phase driver signal 104 is an alternating (AC) or time-varying voltage signal, and the characteristics (amplitude, frequency, and/or phase) of the three-phase driver signal 104 control the speed, direction, and torque of the motor 102.

The inverter 119 includes controllable switches SW1 to SW6. Each controllable switch SW1 to SW6 is any type of electronic switch that has a controllable state. The switches SW1 to SW6 can be controlled to be in a particular state (for example, ON or OFF). In the example shown, each switch SW1 to SW6 is a transistor, and the state of each switch SW1 and SW6 is controlled by adjusting the gate voltage of that transistor.

The motor 102 is a three-phase AC motor, such as, for example, an induction motor or a permanent magnet synchronous machine. The motor 102 includes a stator 109, which is spatially fixed, and a rotor (not shown), which rotates relative to the stator 109 when the driver signal 104 is applied. The stator 109 includes one electrical winding per phase: 109*a*, 109*b*, and 109*c*. The winding 109*a* is electrically connected to the switches SW1 and SW4, the winding 109*b* is electrically connected to the switches SW3 and SW6, and the winding 109*c* is electrically connected to the switchers SW5 and SW2. The motor 102 also includes a frame 108. The frame 108 is generally grounded during operation use of the system 100.

The system 100 also includes a control system 130 that generates a switching command 151. When provided to the inverter 119, the switching command 151 operates the controllable switches SW1 to SW6 in a switching pattern defined by the switching command 151 to produce a target or reference inverter output voltage (Vref). The switches in each phase leg are complementary and have opposite states in any given switching pattern. In other words, if the switching command 151 commands SW1 to be in an OFF state, SW4 is commanded to be in an ON state.

Space vector pulse width modulation (SVPWM) is a common approach to generating the switching command 151. However, controlling an inverter that drives an AC motor with a control signal generated based on standard SVPWM may produce considerable common mode voltage (CMV) in the AC motor. The CMV is the average of the three-phase voltage potential (Vao, Vbo, Vco) referenced to ground or the mid-point of the DC bus (labeled o in FIG. 1). The voltage Vao is the voltage at the point labeled (a) referenced to ground, the voltage Vbo is the voltage at the point labeled (b) referenced to ground, and the voltage Vco is the voltage at the point labeled (c) referenced to ground.

The CMV may cause challenges such as, for example, electromagnetic interference and high bearing currents. Moreover, fluctuations in the amplitude of the CMV tend to generate common-mode currents that flow to ground through parasitic capacitances between the windings 109*a*, 109*b*, 109*c* and the frame 108. Additional paths for common-mode currents to flow may be provided by parasitic capacitances between the windings 109*a*, 109*b*, 109*c* and the stator iron, parasitic capacitances between the windings 109*a*, 109*b*, 109*c* and the rotor iron, by the capacitance between the rotor iron and the stator iron, and/or by ball bearings in the motor 102. The amplitude of the common-mode currents depends on the rate of fluctuation of the CMV, which increases with the switching frequency of the controllable switches SW1 to SW6. The common-mode currents contribute to increased electromagnetic interference (EMI) and premature failure of the ball bearings and/or other components of the motor 102. The presence of electromagnetic interference may lead to noise in the motor and/or make the electrical apparatus 210 more likely to not meet electromagnetic compliance standards.

One reason that standard SVPWM induces relatively high amounts of CMV is that standard SVPWM utilizes zero-voltage vectors as part of the switching patterns that are commanded to the inverter 119. A zero-voltage vector represents a state in which SW1, SW3, SW5 are turned off (or turned on) simultaneously, and the complementary switches SW4, SW6, SW2 are turned on (or turned off) simultaneously. Some legacy approaches attempt to reduce CMV by removing the zero-vector vectors from the inverter switching patterns, but these approaches may have drawbacks. For example, these approaches may have low or acceptable amounts of harmonic distortion and low or acceptable amounts of CMV over a relatively narrow range of operation of the inverter 119.

On the other hand, the control system 130 includes a pulse width modulation (PWM) module 180 reduces CMV in the motor 102 with a multi-faceted approach that involves more than one PWM-based modulation technique. The multi-faceted approach results in reduced CMV over the entire operating range of the inverter 119. As discussed in greater detail below, the PWM module 180 generates the switching command 151 based on one of a plurality of pulse width modulation (PWM) based techniques. As compared to an approach that uses only standard SVPWM modulation, the PWM module 180 reduces the CMV while maintaining voltage linearity across a wide range of output voltages and frequencies of the inverter 119.

FIG. 2 is a schematic of a system 200. The system 200 includes an electrical apparatus 210 that includes a rectifier

217, a DC link 218, and an inverter 219. The inverter 219 provides a three-phase driver signal 204 to a motor 202. A control system 230 includes a PWM module 380 that generates a switching command 251. The switching command 251 controls the inverter 219 to generate the three-phase driver signal 204. The switching command 251 operates the controllable switches SW1 to SW6 in a particular pattern to generate a target or reference inverter output voltage.

An overview of the system 200 is provided prior to discussing the control scheme 306 and the PWM module 380 in more detail.

In the example of FIG. 2, the load 202 is a three-phase motor 202, such as, for example, an induction motor or a permanent magnet synchronous machine. The motor 202 includes a stator 209, which is spatially fixed, and a rotor 208, which rotates relative to the stator 209 when the driver signal 204 is applied. The stator 209 includes one electrical winding per phase: 209*a*, 209*b*, and 209*c*. The motor 202 includes a frame similar to the frame 108 shown in FIG. 1. Loads other than a motor may be used in the system 200.

The electrical power distribution network 201 distributes AC electrical power that has a fundamental frequency of, for example, 50 or 60 Hertz (Hz). The distribution network 201 may have an operating voltage of up to 690V. The distribution network 201 may include, for example, one or more transmission lines, distribution lines, electrical cables, and/or any other mechanism for transmitting electricity. The distribution network 201 includes three phases, which are referred to as a, b, and c.

The electrical apparatus 210 includes input nodes 214*a*, 214*b*, 214*c*, each of which is electrically coupled to a respective one of the three phases a, b, c of the distribution network 201 through a respective filter system 216*a*, 216*b*, 216*c*. Each filter system 216*a*, 216*b*, 216*c* may be an inductor.

The electrical apparatus 210 includes a rectifier 217, a DC link 218, and the inverter 219. The rectifier 217 is a three-phase six-pulse bridge that includes six electronic switches. In the example of FIG. 2, the six electronic switches are diodes D1-D6. Each diode D1-D6 includes a cathode and an anode and is associated with a forward bias voltage. Each diode D1-D6 allows current to flow in the forward direction (from the anode to the cathode) when voltage of the anode is greater than the voltage of the cathode by at least the bias voltage. When the voltage difference between the anode and the cathode is less than the forward bias voltage, the diode does not conduct current in the forward direction.

The input node 214*a* is electrically connected to the anode of the diode D1 and the cathode of the diode D4. The input node 214*b* is electrically connected to the anode of the diode D3 and the cathode of the diode D6. The input node 214*c* is electrically connected to the anode of the diode D5 and the cathode of the diode D2. The diodes D1-D6 rectify the input currents ia, ib, ic into a DC current id.

The diodes D1-D6 are also electrically connected to the DC link 218. The cathode of each diode D1, D3, D5 is electrically connected to the DC link 218, and the anode of each diode D2, D4, D6 is electrically connected to the DC link 218. The DC link 218 includes a capacitor network C. The rectified current id flows into the capacitor network C and is stored. The capacitor network C includes one or more capacitors that store electrical energy when the rectified current id flows from the rectifier 217 and discharge the stored electrical energy when the rectified current id does not flow from the rectifier 217.

The inverter 219 converts the DC power stored in the capacitor network C into a three-phase AC driver signal 204 that is provided to the load 202. The inverter 219 includes a network of electronic switches SW1-SW6 that are controlled by the control system 230 to generate the driver signal 204. Each of the switches SW1-SW6 may be, for example, a power transistor. The three-phase driver signal 204 has phase components 204*u*, 204*v*, 204*w*, each of which is provided to one of the three-phases of the load 202.

The system 200 also includes a sensor system 238 that measures and/or estimates properties or parameters of the driver signal 204 and/or the motor 202. For example, the sensor system 238 may include current sensors that measure the amount of current drawn in each phase of the motor 202 and/or voltage sensors that measure the voltage of each phase component 204*u*, 204*v*, 204*w* of the driver signal 204. The sensor system 238 also may include sensors that measure the angular position of the rotor 208 of the motor 202 and/or the angular velocity of the rotor 208. In some implementations, the control system 230 uses data from the sensor system 238 (other than directly measured position data) to estimate the angular position and/or angular velocity of the rotor 208 based on a sensorless technique.

The control system 230 generates the switching command 251, which controls the switching pattern of the switches SW1-SW6 to generate the driver signal 204 with particular characteristics (for example, amplitude, frequency, and/or phase). The control system 230 implements a control scheme 306 that includes the PWM module 380, both of which are discussed with respect to FIG. 3.

The control system 230 includes an electronic processing module 232, an electronic storage 234, and an input/output (I/O) interface 236. The electronic processing module 232 includes one or more electronic processors. The electronic processors of the module 232 may be any type of electronic processor and may or may not include a general purpose central processing unit (CPU), a graphics processing unit (GPU), a microcontroller, a field-programmable gate array (FPGA), Complex Programmable Logic Device (CPLD), and/or an application-specific integrated circuit (ASIC).

The electronic storage 234 may be any type of electronic memory that is capable of storing data and instructions in the form of computer programs or software, and the electronic storage 234 may include volatile and/or non-volatile components. The electronic storage 234 and the processing module 232 are coupled such that the processing module 232 is able to access or read data from and write data to the electronic storage 234. The electronic storage 234 stores instructions that, when executed, cause the electronic processing module 232 to analyze data and/or retrieve information. The electronic storage 234 also may store information about the system 200. For example, the electronic storage 234 may store information about the motor 202 or the inverter 219.

Additionally, the electronic storage 234 may store executable instructions that implement the control scheme 306 and the PWM module 380. The executable instructions may include software, subroutines, modules, and/or functions that implement standard SVPWM, near state PWM, remote state PWM, single-mode remote state PWM, and dual-mode PWM. These various PWM approaches are discussed below. The electronic storage 234 also may store data and/or information that is used in the control scheme 306 and/or the PWM module 380. For example, the electronic storage 234 may store threshold values and/or boundary values associated with operation modes of the inverter 219 and with the plurality of PWM-based approaches.

The I/O interface 236 may be any interface that allows a human operator and/or an autonomous process to interact with the control system 230. The I/O interface 236 may include, for example, a display (such as a liquid crystal display (LCD)), a keyboard, audio input and/or output (such as speakers and/or a microphone), visual output (such as lights, light emitting diodes (LED)) that are in addition to or instead of the display, serial or parallel port, a Universal Serial Bus (USB) connection, and/or any type of network interface, such as, for example, Ethernet. The I/O interface 236 also may allow communication without physical contact through, for example, an IEEE 802.11, Bluetooth, or a near-field communication (NFC) connection. The control system 230 may be, for example, operated, configured, modified, or updated through the I/O interface 236.

The I/O interface 236 also may allow the control system 230 to communicate with components in the system 200 and with systems external to and remote from the system 200. For example, the I/O interface 236 may control a switch or a switching network (not shown) or a breaker within the system 200 that allows the electrical apparatus 210 to be disconnected from the distribution network 201. In another example, the I/O interface 236 may include a communications interface that allows communication between the control system 230 and a remote station (not shown), or between the control system 230 and a separate monitoring apparatus. The remote station or the monitoring apparatus may be any type of station through which an operator is able to communicate with the control system 230 without making physical contact with the control system 230. For example, the remote station may be a computer-based work station, a smart phone, tablet, or a laptop computer that connects to the control system 230 via a services protocol, or a remote control that connects to the control system 230 via a radio-frequency signal.

Other implementations of the electrical apparatus 210 are possible. For example, the rectifier 217 may be a hybrid diode-thyristor rectifier or an active front end that includes six transistors or other controllable switches instead of the diodes D1-D6. The electrical apparatus 210 may be an adjustable speed drive, a variable frequency drive, or a variable speed drive.

Figure 3:
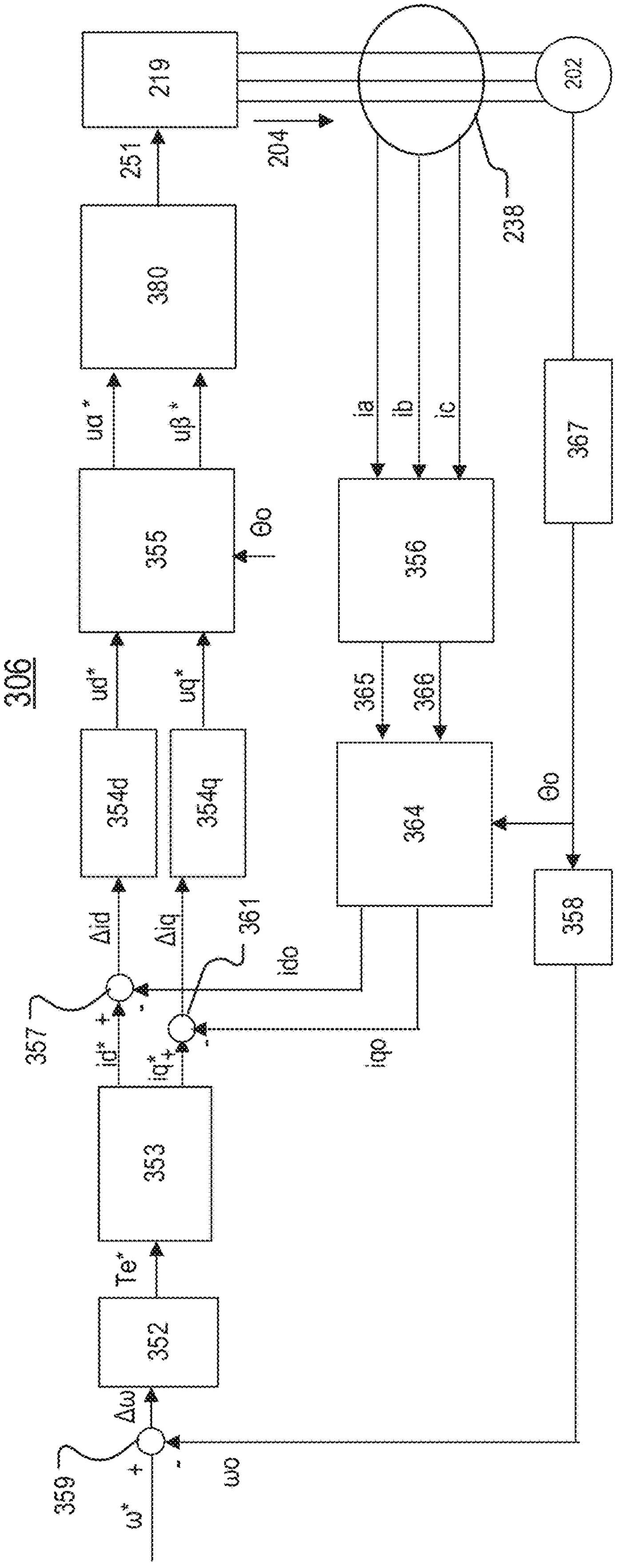
FIG. 3 is a block diagram of an example of a control scheme.

FIG. 3 is a block diagram of the control scheme 306. The control scheme 306 includes the PWM module 380, which generates the switching command 251 to control the switches S1 to S6 of the inverter 219. The inverter 219 generates the three-phase driver signal 204 in response to being controlled by the switching command 251.

The control scheme 306 includes a comparator 359 that compares a target angular velocity (ω*) of the motor 202 to an observed angular velocity (ωo) of the rotor 208 and provides the difference (Δω) to a speed controller 352. The observed angular velocity (ωo) is determined by providing a measured or estimated angular position (θo) of the rotor 208 to a derivative block 358. The observed angular position (θo) of the rotor 208 is output from an angular position block 367, which determines the observed angular position (θo) from a position sensor in the sensor system 238 or by employing a sensorless angular position estimation technique. The derivative block 358 determines the observed angular velocity (wo) by calculating the rate of change in the angular position (θo) over the time period.

The sensor system 238 also measures the current drawn by each phase (each stator winding 209*a*, 209*b*, 209*c*) of the motor 202. The measured currents are ia, ib, and ic. The measured currents ia, ib, ic are provided to a modulation block 356 that implements the Clarke transformation to transform the 3-phase currents (ia, ib, ic) into two orthogonal current components: a component iα along the α axis and a component iβ along the β axis (which is orthogonal to the α axis). The Clark transformation projects a three-phase quantity (such as the current flowing in the windings 209*a*, 209*b*, 209*c* of the stator 209 or the voltage applied to the windings 209*a*, 209*b*, 209*c* of the stator 209) onto a two-dimensional stationary coordinate system defined by the α axis and the β axis. The Clark transformation is shown in Equation (1):

$$i_{\alpha\beta} = \frac{2}{3}\begin{bmatrix} 1 & -\frac{1}{2} & -\frac{1}{2} \\ 0 & \frac{\sqrt{3}}{2} & -\frac{\sqrt{3}}{2} \end{bmatrix}\begin{bmatrix} i_a \\ i_b \\ i_c \end{bmatrix}, \quad \text{Equation (1)}$$

where ia, ib, ic are the instantaneous currents in the stator windings 209*a*, 209*b*, 209*c*, and $i_{\alpha\beta}$ is a vector that includes a component along the α axis (365) and a component along the β axis (366). The vectors 365 and 366 are provided to a modulation block 364 that implements the Park transformation. The Park transformation rotates the stationary α, β axes at a frequency @. The Park transformation is shown in Equation (2):

$$i_{dq} = \begin{bmatrix} \cos(\theta) & \sin(\theta) \\ -\sin(\theta) & \cos(\theta) \end{bmatrix}\begin{bmatrix} i_\alpha \\ i_\beta \end{bmatrix}, \quad \text{Equation (2)}$$

where $i_{dq}$ is a vector that includes a component along the d axis (ido, or the observed d-axis current) and a component along the q axis (iqo, or the observed q-axis current), and θ is the observed angular position (θo) of the rotor 208 of the motor 202.

The speed controller 352 generates a torque command Te*, which is provided to a current command generator block 353. The current command generator block 353 generates a d-axis current command id* and a q-axis current command iq*. The d-axis current command id* is compared to the observed d-axis current (ido) at a comparator 357 to determine a difference (Δid) between id* and ido*, and the difference (Δid) is provided to a d-axis current controller 354*d*. The q-axis current command iq* is compared to the observed q-axis current (iqo) at a comparator 361 to determine a difference (Δiq) between iq* and iqo, and the difference (Δiq) is provided to a q-axis current controller 354*q*.

The d-axis current controller 354*d* is a proportional-integral (PI) controller with a pre-determined gain constant Kd. The q-axis current controller 354*q* is a PI controller with a pre-determined gain constant Kq. The d-axis current controller 354*d* determines a d-axis voltage command ud* that minimizes the d-axis current error ($\Delta i_d$). The q-axis current controller 354*q* determines a q-axis voltage command uq* that minimizes the q-axis current error ($\Delta i_q$).

The d-axis voltage command ud* and the q-axis voltage command uq* are provided to a modulation block 355 that implements the inverse Park transformation. The inverse Park transformation projects the d-axis and q-axis voltage commands (ud*, uq*) onto the stationary α, β reference frame. The outputs of the modulation block 355 are uα* and uβ*, which are the components of the voltage to be applied to the stator 209 in the stationary α, β reference frame.

The voltage commands uα* and uβ* are provided to the PWM module 380. The module 380 implements a PWM-based control to generate the switching command 251.

As discussed above, the inverter 219 includes the controllable switches S1 to S6, each of which are controllable to be in an ON state or an OFF state. For example, each switch S1 and S6 may be turned ON or OFF by controlling the voltage at the gate of the switch. When applied to the inverter 219, the switching command 251 operates the switches S1 and S6 in the prescribed switching pattern by controlling the voltage at the gate of each switch. For example, the switching command 219 may control a voltage and/or current source (not shown) to control the gate voltages.

The state of the switches S1 to S6 is controlled and changed over time in a switching pattern defined by the switching command 251. The switches S1, S3, and S5 are the upper switches, and the switches S4, S6, and S2 are the lower switches. There are eight valid switching configurations or state combinations for the switches S1, S3, and S5. The switching states are represented by space vectors (also referred to as voltage vectors) V1 to V8. The switching states V1 to V8 for the upper switches S1, S3, S5 are shown in Table 1:

| Vector | S1 | S3 | S5 |
|---|---|---|---|
| V1 | 1 | 0 | 0 |
| V2 | 1 | 1 | 0 |
| V3 | 0 | 1 | 0 |
| V4 | 0 | 1 | 1 |
| V5 | 0 | 0 | 1 |
| V6 | 1 | 0 | 1 |
| V7 | 0 | 0 | 0 |
| V8 | 1 | 1 | 1 |

The state of each lower switch S4, S6, S2 is opposite the state of the respective upper switch S1, S3, S5 such that there are eight total switching configurations or combinations for the inverter 219.

Figure 4:
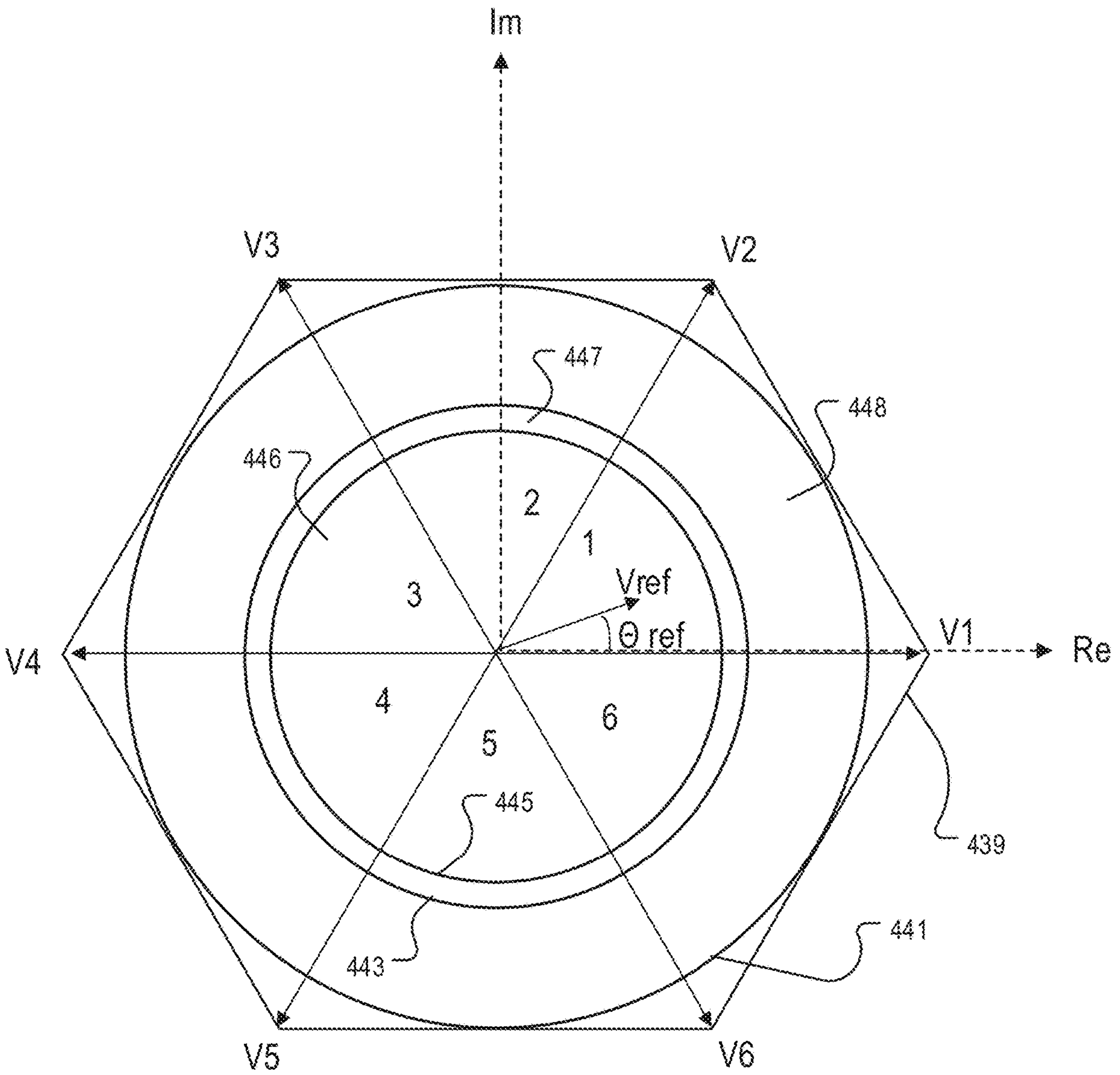
FIG. 4 is a graphical representation that includes voltage vectors for an inverter.

Referring also to FIG. 4, the six non-zero (or active) vectors (V1 to V6) define a hexagon 439 and six sectors (1 to 6) in a rectilinear coordinate system (Re, Im). The angle between any two adjacent non-zero vectors (V1 to V6) is 60 degrees) (°). The two zero vectors (V7 and V8) are at the origin. The perimeter of the hexagon 439 represents the limit of operation of the inverter 219.

The voltage commands uα* and uβ* input to the PWM module 380 define the vector Vref at a phase angle (θref) in the Re, Im coordinate system shown in FIG. 4. The voltage vector (Vref) and the angle (θref) are referred to as the target or reference voltage and the target or reference angle, respectively. The modulation index (M) associated with the target or reference voltage is determined by Equation (3):

$$M = \frac{Vref}{\frac{2}{\pi}Vdc}, \quad \text{Equation (3)}$$

where M is the modulation index, Vref is the amplitude of the reference or target voltage, and Vdc is the measured voltage across the DC link 218. The modulation index has a value between 0 and 1.

The PWM module 380 uses the modulation index (M) and/or a CMV reduction flag to determine which of a plurality of PWM-based approaches to use to synthesize Vref and generate the switching command 251. The plurality of PWM-based approaches include a near state PWM approach, a single-mode remote state PWM approach, a dual-mode remote state PWM approach, and standard SVPWM.

In standard SVPWM, the switching states V1 to V8 are combined to approximate a voltage vector of any magnitude and angle within the hexagon 439. For example, a desired inverter output voltage having a magnitude represented by the vector Vref and a phase angle θref that places the voltage vector in sector 1 is achieved by a switching sequence that utilizes the two adjacent switching states (V1 and V2 in this example) for a specified period of time and a zero vector (V7 or V8) for the rest of the period.

In the near state PWM approach, Vref is synthesized from a group of three non-zero (or active) voltage vectors: the voltage reference closest to Vref is the first voltage vector, and the two voltage vectors neighboring the first voltage vector are the second and third voltage vectors. In the example shown in FIG. 4, Vref is closest to the voltage vector V1. The three voltage vectors used to synthesize Vref based on the near state PWM approach would be V1, V2, and V6. Continuing this example, the synthesis of Vref is shown in Equation (4):

$$Vref = \frac{T1}{Ts}V1 + \frac{T2}{Ts}V2 + \frac{T6}{Ts}V6, \quad \text{Equation (4)}$$

where Ts is the time for one period or switching cycle of the switching command 252; and T1, T2, and T6 are dwell times. For Vref in sector 1, the dwell times for the near state PWM approach are determined as follows:

$$T1 = Ts*\left(\frac{6}{\pi}M\cos\theta - 1\right), \quad \text{Equation (5a)}$$

$$T2 = Ts*\left(1 - \frac{2\sqrt{3}}{\pi}M\cos\left(\frac{\pi}{6} - \theta\right)\right), \text{ and} \quad \text{Equation (5b)}$$

$$T6 = 1 - T1 - T2, \text{ where} \quad \text{Equation (5bc)}$$

Ts is the switching cycle time, M is the modulation index for the reference or target voltage Vref, and θ is θref.

Figure 5:
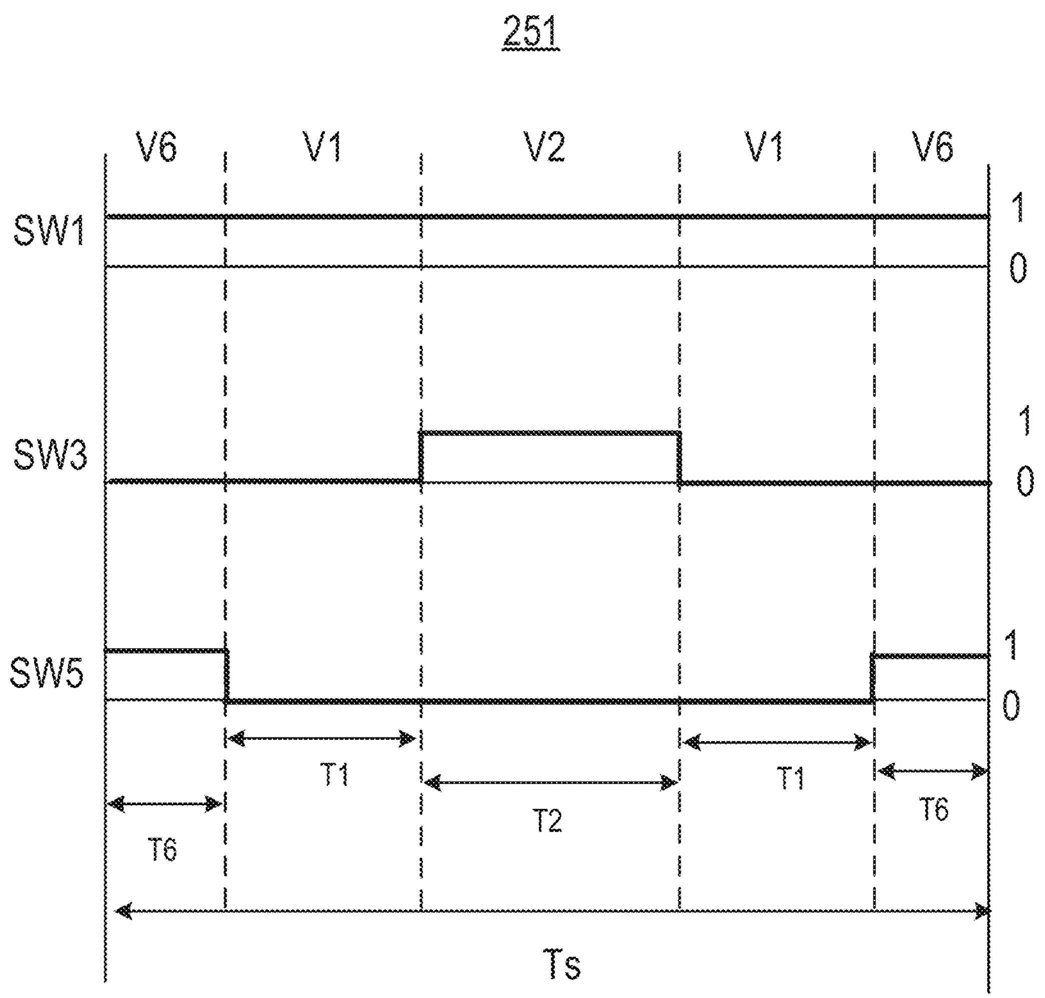
FIG. 5 shows an example of a switching command for an inverter.

The switching command 251 is binary signal that transitions between high (1) and low (0) over the switching cycle Ts and is symmetrical about the midpoint of the switching cycle. The dwell times determine how long the switching command 251 remains high or low for a particular voltage vector. FIG. 5 shows an example of the switching command 251 determined from Equations (4) and (5a) to (5c) over one switching cycle Ts.

The dwell times for a Vref in sector 1 (such as shown in FIG. 4) for the remote state PWM approaches are determined as follows:

$$T3 = Ts*\left[\frac{1}{3} - \frac{2}{\pi}M\cos\left(\frac{\pi}{3} + \theta\right)\right] = T4, \quad \text{Equation (6a)}$$

$$T1 = Ts*\left(\frac{1}{3} - \frac{2}{\pi}M\cos\theta\right) = T2, \quad \text{Equation (6b)}$$

$$T5 = 1 - T3 - T1, \quad \text{Equation (6c)}$$

and $$T6 = 1 - T4 - T2, \quad \text{Equation (6d)}$$

where Ts is the switching cycle time, M is the modulation index for the target or reference voltage Vref, and θ is θref.

In the single-mode remote state PWM, Vref is synthesized using active (non-zero) voltage vectors that are 120° apart from each other. In other words, the single-mode remote state PWM uses only odd non-zero voltage vectors (V1, V3, V5) or only even non-zero voltage vectors (V2, V4, V6) to synthesize Vref. Thus, the switching command 251 includes only the odd non-zero voltage vectors or only the even non-zero voltage vectors.

In the dual-mode remote state PWM, the sectors 1 to 6 and the non-zero voltage vectors V1 to V6 are rotated by 30° clockwise compared to the sectors shown in FIG. 4. In the dual-mode remote state PWM, the non-zero voltage vectors V1 to V6 define rotated sectors as follows: sector 1: 330°≤θref<30°, sector 2: 30°≤θref<90°, sector 3: 90°≤θref<150°, sector 4: 150°≤θref<210°, sector 5: 210°≤θref<270°, and sector 6: 270°≤θref <330°. If the reference voltage Vref is in rotated sector 1, 3, or 5, Vref is synthesized using only odd voltage vectors (V1, V3, V5). If Vref is in rotated sector 2, 4, or 6, Vref is synthesized using only even voltage vectors (V2, V4, V6).

In the linear operating region of each non-zero voltage vector PWM-based approach, the dwell time equations (Equations (5a) to (5c) and (6a) to (6d)) yield meaningful results, and the inverter 219 acts as a linear voltage amplifier. Outside of the linear operating region of a particular active voltage vector PWM-based approach, using that approach to generate the switching command 251 causes the inverter 219 to no longer behave as a linear amplifier, increases the common mode voltage in the motor 202, and generates low-frequency harmonics at the inverter 219 output that distort the current in the motor coils 209*a*, 209*b*, 209*c*.

The linear operating regions of each active voltage vector PWM approach is defined by a modulation index (M) range. The linear operating region of the single-mode remote PWM approach includes modulation indexes (M) that are less than or equal to 0.524. The linear operating region of the dual-mode remote PWM approach includes modulation indexes (M) greater than 0.524 and less than or equal to 0.605. The linear operating region of the near state PWM approach includes modulation indexes (M) that are greater than 0.605 and less than 0.906.

FIG. 4 shows the linear operating regions of the active vector PWM-based approaches. A first circle 441 with a radius of 0.906 is inscribed in the hexagon 439, a second circle 443 has a radius of 0.605 and is within the first circle 441, and a third circle 445 has a radius of 0.524 and is within the second circle 443. The third circle 445 defines a single-mode remote state linear operating region 446. Reference voltages (Vref) that have a modulation index (M) that falls within the third circle 445 may be synthesized with the single-mode remote state PWM approach while preserving the voltage linearity of the inverter 219. An annulus 447 between the third circle 445 and the second circle 443 defines a dual-mode remote state operating region 447. Reference voltages (Vref) that have a modulation index (M) in the region 447 may be synthesized with the dual-mode remote state PWM approach while preserving the voltage linearity of the inverter 219. An annulus 448 between the second circle 443 and the first circle 441 defines a near state linear operating region. Reference voltages (Vref) that have a modulation index (M) in the annulus 448 may be synthesized with the near state PWM approach while preserving the voltage linearity of the inverter 219.

Figure 6:
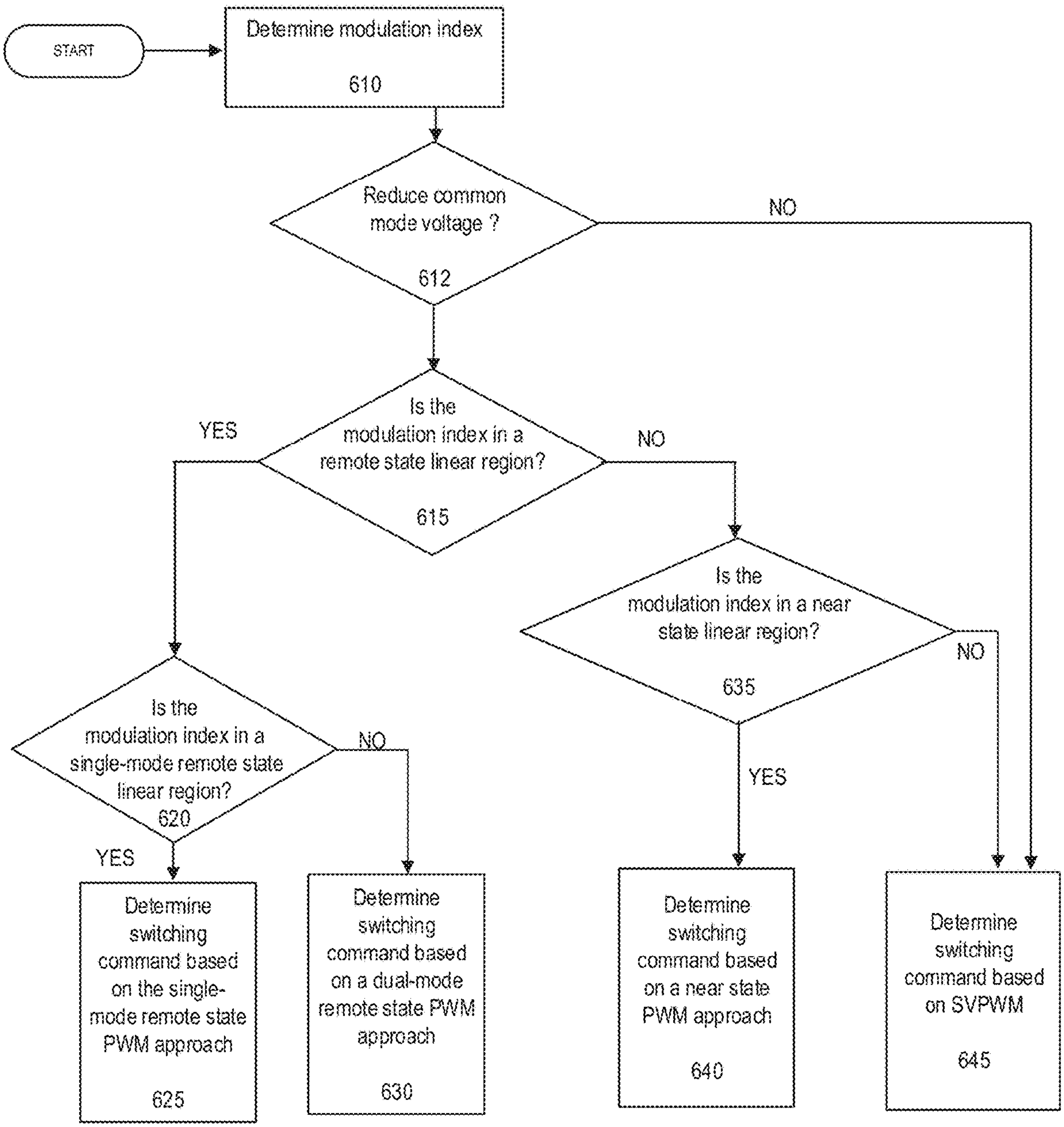
FIG. 6 is a flow chart of an example of a common mode voltage reduction process.

Referring to FIG. 6, a flow chart of a process 600 is shown. The process 600 is an example of a common mode voltage reduction process that may be implemented by the control system 230 and the PWM module 380. The process 600 may be implemented as executable instructions that are stored on the electronic storage 234 and executed by the electronic processing module 232. The process 600 may be implemented as software and may be programmed into a control system in an existing power converter. Moreover, the process 600 may be implemented as a control system or controller that is installed in existing power converter as a software update or as part of a firmware update.

The modulation index (M) is determined (610) using Equation (3). In Equation (3), the voltage of the DC link 218 (VDC) is a measured value of the voltage across the DC link 218 and Vref is the reference voltage associated with the voltage commands (uα*, uβ*) output from the modulation block 355 (FIG. 3).

The process 600 determines whether to reduce the common mode voltage (CMV) (612). The determination of whether to reduce the CMV may include analyzing a flag or user input. For example, the operator of the power converter 210 may indicate that the PWM module 380 should be activated by, for example, selecting a CMV reduction mode at the I/O interface 236. In these implementations, the input sets a value for of a flag stored on the electronic storage 234 to reflect the operator's selection. For example, if the operator turns on the CMV reduction mode, the flag is set to 1. If the operator turns off the CMV reduction mode, the flag is set to 0. In these implementations, the PWM module 380 is activated if the flag is 1 and is not activated if the flag is 0. Entities other than the operator may select the CMV reduction mode through the I/O interface 236. For example, a manufacturer of the power converter 210 may select or deselect the CMV reduction mode through the I/O interface 236 or hard-code the flag value prior to providing the inverter 219 to the end user.

In some implementations, the value of the flag is set to 1 or 0 by an entity that may be distinct from the operator (for example, the manufacturer, distributer, or assembler of the power converter 210). In these implementations, if the flag is set to 1, the PWM module 380 is always activated.

If the CMV reduction is not indicated, the switching command 251 is determined based on the standard SVPWM approach (645). If CMV reduction is indicated, the modulation index (M) determined at (610) is compared to the linear operating boundary for the remote state PWM approaches to determine whether the modulation index (M) is in the linear operating region for the single-mode remote state PWM approach or the dual-mode remote state PWM approach (615). Modulation indexes that are less than or equal to 0.605 (which is the radius of the second circle 443 of FIG. 4) are within the linear operating region of one of the two remote state PWM approaches. Thus, to determine whether or not the modulation index (M) determined in (610) is in the linear operating region for a remote state PWM approach, the modulation index (M) is compared to 0.605. If the modulation index (M) is greater than 0.605, the modulation index (M) is not in the linear region for a remote state PWM approach, and the process proceeds to (635). If the modulation index (M) is on or inside the second circle 443 (which occurs if M is less than or equal to 0.605), the reference voltage Vref can be synthesized with one of the remote state PWM approaches while maintaining the voltage linearity of the inverter 219. The process advances to (620) to determine which of the two remote state PWM approaches to select.

At (620), the modulation index (M) determined at (610) is compared to the boundary that defines the single-mode remote state PWM approach. The boundary that defines the single-mode remote state PWM approach is the third circle 445 (FIG. 4). Thus, if the modulation index (M) is less than or equal to the radius of the third circle 445 (0.524), the reference voltage Vref is in or on the third circle 445, the single-mode remote state PWM approach is selected. The switching command 251 is determined with the single-mode remote state PWM approach (625).

Returning to (620), if the modulation index (M) is greater than 0.524 but less than or equal to 0.605, the modulation index (M) is not in the single-mode remote state linear operating region 446 and is instead in the dual-mode remote state PWM linear operating region 447. The dual-mode remote state PWM approach is selected. The switching command 251 is determined with the dual-mode remote state PWM approach (630).

Returning to (615), if the modulation index (M) determined in (610) is not in a remote state linear region, the process 600 determines whether the modulation index (M) is in the near state PWM linear operating region 448 (635). The modulation index (M) is in the near state PWM linear region 448 if the modulation index (M) is greater than 0.605 and less than or equal to 0.906. The switching command 251 is determined with the near state PWM approach (640).

If the modulation index (M) determined in (610) is not in the near state PWM linear region 448, none of the three active voltage vector PWM approaches are selected and the switching command 251 is determined using standard SVPWM (645).

The switching command 251 is applied to the inverter 219 to generate the reference or target voltage (Vref) at the output of the inverter 219.

Other implementations of the process 600 are possible. For example, in some implementations, the modulation index (M) is only determined when there is an indication that the CMV reduction is to be performed. In other words, (612) may be performed before (610). In these implementations, when the CMV reduction is not to be performed, the process 600 advances to (645) to determine the switching command 251 based on standard SVPWM without necessarily determining the modulation index (M) associated with the target or reference voltage Vref.

FIGS. 7A-7C and 8A-C relate to simulated results. The simulated system was similar to the system 100. In the simulation Vdc was 300 volts (V) and the inverter fed a three-phase R-L load that had a resistance (R) of 10 ohm (Ω) and an inductance (L) of 6.5 milihenries. The inverter generated the three-phase driver signal in response to receiving a switching command from a control system.

Figure 7A:
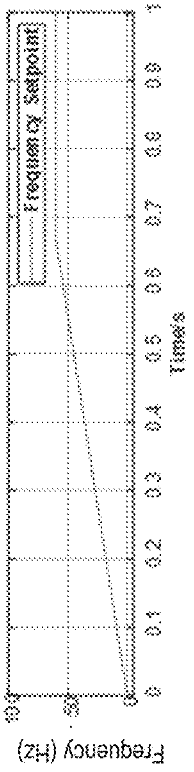
FIGS. 7A-7C and 8A-8C show simulated data.
Figure 7B:
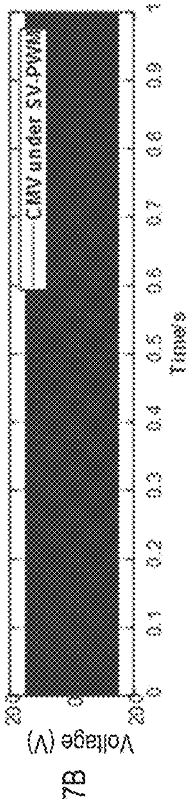
Figure 7C:
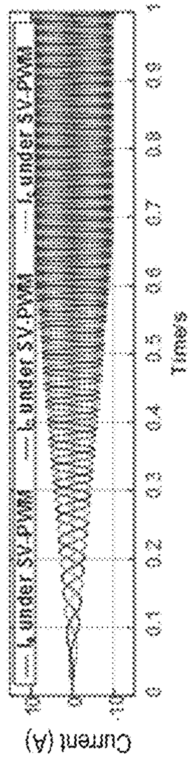

FIGS. 7B and 7C show results when the control system did not include the PWM module 380 and the switching command was generated only with standard SVPWM. FIGS. 8B and 8C show results for a simulation in which the control system included the PWM module 380 and the switching command was generated with a PWM approach using the process 600 discussed above.

Figure 8A:
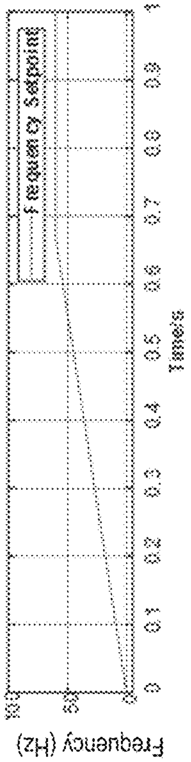
Figure 8B:
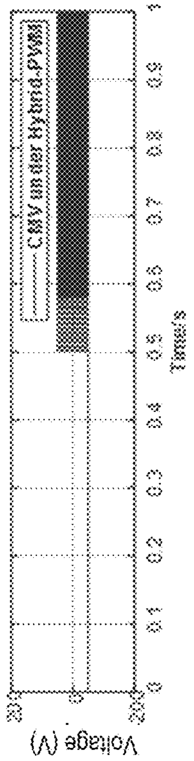
Figure 8C:
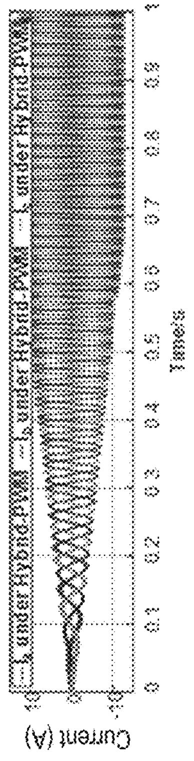

FIGS. 7A and 8A show commanded motor speed (Hz) as a function of time (seconds). FIGS. 7B and 8B show the common mode voltage induced in the motor as a function of time (seconds). FIGS. 7C and 8C show the three-phase motor current as a function of time (seconds). The commanded motor speed (FIGS. 7A and 8A) was the same for the standard SVPWM simulation (FIGS. 7B and 7C) and the simulation of the PWM module 380 (FIGS. 8B and 8C). The time scale is the same on all figures FIGS. 7A-7C and 8A-8C.

As shown in FIG. 7B, in the standard SVPWM approach, the amplitude of the common mode voltage is about +/−150V. As shown in FIG. 8B, the PWM module 380 reduces the common mode voltage significantly. For motor speeds below about 48 Hz, the common mode voltage is essentially eliminated. For motor speeds above about 48 Hz, the amplitude of the common mode voltage is only a third of the common mode voltage of the standard SVPWM (an amplitude between about +/−50V). Thus, the PWM module 380 greatly reduces the amount of common mode voltage induced in the motor.

FIG. 7C shows the current drawn by the R-L load when the standard SVPWM approach was used. FIG. 8C shows the current drawn by the R-L load when the PWM module 380 was used. As is apparent by comparing FIG. 7C and FIG. 8C, the current drawn by the R-L when the PWM module was used is smooth and relatively free of distortions, indicating that the current harmonics did not increase by a significant amount. In other words, the data in FIG. 8B and FIG. 8C indicates that the PWM module 380 reduces CMV while also maintaining good current harmonic performance.

These and other implementations are within the scope of the claims.

What is claimed is:

1. A system comprising:
an energy storage apparatus;
an inverter electrically coupled to the energy storage apparatus; and
a pulse width modulation module configured to:
determine a modulation index based on a voltage of the energy storage apparatus and a target output voltage of the inverter;
select one of a plurality of pulse width modulation (PWM) approaches based on the modulation index; and
determine a switching command for the inverter based on the target output voltage and the selected one of the plurality of PWM approaches, wherein the plurality of PWM approaches comprise: a near state PWM approach, a single-mode remote state PWM approach, and a dual-mode remote state PWM approach.

2. The system of claim 1, wherein, to select one of a plurality of PWM approaches based on the modulation index, the pulse width modulation module is configured to determine in which of at least two modulation regions the modulation index falls.

3. The system of claim 2, wherein the at least two modulation regions comprise a remote state PWM region and a near state PWM region.

4. The system of claim 3, wherein the remote state PWM region comprises: a single-mode remote state PWM region, and a dual-mode remote state PWM region.

5. The system of claim 4, wherein each of the near state PWM region, the single-mode remote state PWM region, and the dual-mode remote state PWM region is defined by a respective minimum modulation index value and a maximum modulation index value, and the dual-mode remote state PWM region is between the single-mode remote state PWM region and the near state PWM region.

6. The system of claim 1, further comprising an energy source electrically connected to the energy storage apparatus, the energy source configured to provide a direct current (DC) current to the energy storage apparatus.

7. The system of claim 6, wherein the energy source comprises a rectifier.

8. The system of claim 1, wherein the pulse width modulation module is configured to select the one of the plurality of PWM approaches based on the modulation index and a setting, the setting indicating whether or not to reduce common mode voltage.

9. A control system for an inverter, the control system comprising:
- a pulse width modulation module configured to:
  - determine a modulation index based on a voltage of an energy storage apparatus in the inverter and a target output voltage of the inverter;
  - select one of a plurality of pulse width modulation (PWM) approaches based on one or more of the modulation index and a common mode voltage setting;
  - determine a switching command for the inverter based on the target output voltage and the selected one of the plurality of PWM approaches; and
  - provide the switching command to the inverter to thereby modulate DC energy in the energy storage apparatus into a driver signal.

10. The control system of claim 9, wherein the pulse width modulation module is configured to select the one of the plurality of PWM approaches based on the modulation index and the common mode voltage setting.

11. The control system of claim 10, wherein the common mode voltage setting indicates whether or not to reduce common mode voltage; and
- the pulse width modulation module is configured to select one of a plurality of active voltage vector PWM approaches based on the modulation index if the common mode voltage setting indicates to reduce common mode voltage; and
- the pulse width modulation module is configured to select space vector pulse width modulation (SVPWM) if the common mode voltage setting indicates not to reduce common mode voltage.

12. The control system of claim 11, wherein the plurality of active voltage vector PWM approaches comprise: a near state PWM approach, a single-mode remote state PWM approach, and a dual-mode remote state PWM approach.

13. The control system of claim 9, wherein the plurality of PWM approaches comprise: a near state PWM approach, a single-mode remote state PWM approach, a dual-mode remote state PWM approach, and space vector pulse width modulation (SVPWM).

14. The control system of claim 13, wherein the driver signal is configured for a load, and, for modulation indexes less than or equal to 0.906, providing the driver signal to the load induces less common mode voltage in the load than a driver signal produced by controlling the inverter based on a switching command determined based on the target output voltage and standard SVPWM induces.

15. The control system of claim 13, wherein the driver signal is configured for a load, and for modulation indexes less than or equal to 0.906, providing the driver signal to the load induces lower common mode currents in the load than a driver signal produced by controlling the inverter based on a switching command determined based on the target output voltage and standard SVPWM induces.

16. The control system of claim 9, wherein selecting the one of the plurality of PWM approaches comprises selecting the PWM approach that has a linear region that includes the determined modulation index.

17. A system comprising:
- an energy storage apparatus;
- an inverter electrically coupled to the energy storage apparatus; and
- a pulse width modulation module configured to:
  - determine a modulation index based on a voltage of the energy storage apparatus and a target output voltage of the inverter;
  - select one of a plurality of pulse width modulation (PWM) approaches based on the modulation index; and
  - determine a switching command for the inverter based on the target output voltage and the selected one of the plurality of PWM approaches, wherein the pulse width modulation module is configured to select the one of the plurality of PWM approaches based on the modulation index and a setting, the setting indicating whether or not to reduce common mode voltage.

18. The system of claim 17, wherein the plurality of PWM approaches comprise: a near state PWM approach, a single-mode remote state PWM approach, and a dual-mode remote state PWM approach.

19. The system of claim 17, wherein if the setting indicates not to reduce common mode voltage, the selected one of the plurality of PWM approaches is space vector pulse width modulation (SVPWM).

20. The system of claim 17, wherein the setting comprises a value that is set based on a user input.

21. A system comprising:
- an energy storage apparatus;
- an inverter electrically coupled to the energy storage apparatus; and
- a pulse width modulation module configured to:
  - determine a modulation index based on a voltage of the energy storage apparatus and a target output voltage of the inverter;
  - select one of a plurality of pulse width modulation (PWM) approaches based on the modulation index; and
  - determine a switching command for the inverter based on the target output voltage and the selected one of the plurality of PWM approaches, wherein to select one of a plurality of PWM approaches based on the modulation index, the pulse width modulation module is configured to determine in which of at least two modulation regions the modulation index falls, the at least two modulation regions comprise a remote state PWM region and a near state PWM region, and the remote state PWM region comprises: a single-mode remote state PWM region, and a dual-mode remote state PWM region.

* * * * *